(12) United States Patent
Hara

(10) Patent No.: US 12,428,572 B2
(45) Date of Patent: Sep. 30, 2025

(54) INKJET INK

(71) Applicant: KYOCERA Document Solutions Inc., Osaka (JP)

(72) Inventor: Miyuki Hara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 171 days.

(21) Appl. No.: 18/356,309

(22) Filed: Jul. 21, 2023

(65) Prior Publication Data

US 2024/0026176 A1  Jan. 25, 2024

(30) Foreign Application Priority Data

Jul. 25, 2022 (JP) ................. 2022-118012

(51) Int. Cl.
| | | |
|---|---|---|
| C09D 11/322 | (2014.01) | |
| C09D 11/102 | (2014.01) | |
| C09D 11/108 | (2014.01) | |
| C09D 11/38 | (2014.01) | |

(52) U.S. Cl.
CPC .......... *C09D 11/322* (2013.01); *C09D 11/102* (2013.01); *C09D 11/108* (2013.01); *C09D 11/38* (2013.01)

(58) Field of Classification Search
CPC ... C09D 11/322; C09D 11/102; C09D 11/108; C09D 11/38
See application file for complete search history.

(56) References Cited

U.S. PATENT DOCUMENTS

| | | | |
|---|---|---|---|
| 2015/0361282 A1* | 12/2015 | Nakagawa | C09D 11/033 428/207 |
| 2016/0264808 A1* | 9/2016 | Kido | C09D 11/106 |

FOREIGN PATENT DOCUMENTS

| | | |
|---|---|---|
| EP | 3904470 A1 | 11/2021 |
| JP | 2020-105299 A | 7/2020 |

* cited by examiner

*Primary Examiner* — Yaovi M Ameh
(74) *Attorney, Agent, or Firm* — Studebaker Brackett PLLC

(57) ABSTRACT

An inkjet ink contains a pigment, urethane resin particles, polyolefin resin particles, dipropylene glycol monomethyl ether, propylene glycol, and water. The urethane resin particles have a percentage content of at least 2.5% by mass and no greater than 9.0% by mass. The polyolefin resin particles have a percentage content of at least 2.5% by mass and no greater than 9.0% by mass. The dipropylene glycol monomethyl ether has a percentage content of at least 4.0% by mass and no greater than 25.0% by mass. The propylene glycol has a percentage content of at least 9.0% by mass and no greater than 35.0% by mass.

5 Claims, No Drawings

INKJET INK

INCORPORATION BY REFERENCE

The present application claims priority under 35 U.S.C. § 119 to Japanese Patent Application No. 2022-118012, filed on Jul. 25, 2022. The contents of this application are incorporated herein by reference in their entirety.

BACKGROUND

The present disclosure relates to an inkjet ink.

Some inkjet recording apparatus uses a water-based inkjet ink containing a pigment and an aqueous medium. The inkjet ink is required to have excellent ejection stability. The inkjet ink forms an image on a non-permeable recording medium such as a biaxially oriented polypropylene (OPP) film or a polyethylene terephthalate (PET) film in some cases.

In a case in which an image is formed on the non-permeable recording medium with the inkjet ink, the image tends to have low adhesion to the recording medium with a result that the image may peel off from the recording medium upon being rubbed by another member. In view of the foregoing, the inkjet ink used for a purpose such as above is required to be able to form images with excellent adhesion to various non-permeable recording mediums of which typical examples include an OPP film and a PET film. In terms of inhibiting occurrence of blotting in formed images, the inkjet ink used for a purpose such as above is demanded to have a quick-drying property.

In order to meet such a demand, an inkjet ink is proposed that contains for example a pigment, a polymer dispersant, water, and a water-soluble organic solvent that contains polypropylene glycol monoalkyl ether. The above inkjet ink is thought to be able to form images with excellent adhesion to a recording medium.

SUMMARY

An inkjet ink according to an aspect of the present disclosure contains a pigment, urethane resin particles, polyolefin resin particles, dipropylene glycol monomethyl ether, propylene glycol, and water. The urethane resin particles have a percentage content of at least 2.5% by mass and no greater than 9.0% by mass. The polyolefin resin particles have a percentage content of at least 2.5% by mass and no greater than 9.0% by mass. The dipropylene glycol monomethyl ether has a percentage content of at least 4.0% by mass and no greater than 25.0% by mass. The propylene glycol has a percentage content of at least 9.0% by mass and no greater than 35.0% by mass.

DETAILED DESCRIPTION

The following describes an embodiment of the present disclosure. In the following, measurement values for volume median diameter ($D_{50}$) are values as measured using a dynamic light scattering type particle size distribution analyzer ("ZETASIZER (registered Japanese trademark) NANO ZS", product of Malvern Instruments Ltd.) unless otherwise stated. In the present specification, the term "(meth)acryl" is used as a generic term for both acryl and methacryl.

<Ink>

The following describes an inkjet ink (also referred to below simply as ink) according to an embodiment of the present disclosure. The ink of the present disclosure contains a pigment, urethane resin particles, polyolefin resin particles, dipropylene glycol monomethyl ether, propylene glycol, and water. The urethane resin particles have a percentage content of at least 2.5% by mass and no greater than 9.0% by mass. The polyolefin resin particles have a percentage content of at least 2.5% by mass and no greater than 9.0% by mass. The dipropylene glycol monomethyl ether has a percentage content of at least 4.0% by mass and no greater than 25.0% by mass. The propylene glycol has a percentage content of at least 9.0% by mass and no greater than 35.0% by mass. Preferably, the ink of the present disclosure further contains a later-described pigment coating resin.

The ink of the present disclosure is suitable for image formation on a non-permeable recording medium. An ink is less penetrable through a non-permeable recording medium than through a permeable recording medium. An aqueous medium has an absorption in the non-permeable recording medium of no greater than $1.0 \text{ g/m}^2$, for example. Examples of the non-permeable recording medium include resin-made recording mediums, metal-made recording mediums, and glass-made recording mediums. Example of the resin-made recording mediums includes resin sheets and resin films. The resin contained in the resin-made recording mediums is preferably a thermoplastic resin. Specific examples of the resin include polyethylene, polypropylene, polyvinyl chloride, and polyethylene terephthalate (PET). Examples of the resin-made recording mediums include an OPP film and a PET film. In image formation on a resin-made recording medium with the ink of the present disclosure, the recording medium may have a surface (printing surface) subjected to corona discharge treatment.

As a result of having the above features, the ink of the present disclosure has excellent ejection stability and a quick-drying property and can form images with excellent adhesion to various non-permeable recording mediums. The reason thereof can be inferred as follows. The ink of the present disclosure contains urethane resin particles and polyolefin resin particles as binders. The urethane resin particles have high affinity with non-permeable recording mediums with a polarity of which a typical example is a PET film. The polyolefin resin particles have high affinity with non-permeable recording mediums with no polarity of which a typical example is an OPP film. The ink of the present disclosure containing two types of resin particles can form images with excellent adhesion to various non-permeable recording mediums with different polarities.

Furthermore, the dipropylene glycol monomethyl ether contained in the ink of the present disclosure has moderate ease of drying and also has a property that makes it easier for an ink to wet and spread. As a result of containing a certain amount of dipropylene glycol monomethyl ether, the ink of the present disclosure can exhibit an excellent quick-drying property. Furthermore, the propylene glycol contained in the ink of the present disclosure has a moisturizing property. Nozzle clogging is caused in a manner that ink droplets of an ink dries to precipitate their solid content upon the ink droplets attaching to the nozzles of an inkjet recording apparatus. However, as a result of the ink of the present disclosure containing a certain amount of propylene glycol, occurrence of such nozzle clogging with ink droplets of the ink can be inhibited. Furthermore, dipropylene glycol monomethyl ether and propylene glycol impart to the ink viscosity and surface tension suitable for inkjet ejection. Therefore, the ink of the present disclosure can exhibit excellent ejection stability.

The ink of the present disclosure is described further in detail below. For each component indicated in the following description, one type of the component may be used independently or two or more types of the component may be used in combination.

[Pigment]

In the ink of the present disclosure, the pigment constitutes pigment particles together with a pigment coating resin, for example. The pigment particles are each constituted by a core containing a pigment and a pigment coating resin covering the core.

The pigment coating resin is present in a dispersed state in an aqueous medium, for example. In terms of optimizing color density, hue, or stability of the ink of the present disclosure, the pigment particles have a volume median diameter of preferably at least 30 nm and no greater than 200 nm, and more preferably at least 70 nm and no greater than 130 nm.

Examples of the pigment include yellow pigments, orange pigments, red pigment, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, specifically 15:3). Examples of the violet pigments include C.I. Pigment Violet (19, 23, or 33). Examples of the black pigments include C.I. Pigment Black (7).

The pigment in the ink of the present disclosure has a percentage content of preferably at least 0.5% by mass and no greater than 10.0% by mass, and more preferably at least 1.5% by mass and no greater than 5.0% by mass. As a result of the percentage content of the pigment being set to at least 0.5% by mass, the ink of the present disclosure can form images with desired image density. As a result of the percentage content of the pigment being set to no greater than 10.0% by mass by contrast, fluidity of the ink of the present disclosure can be ensured.

[Pigment Coating Resin]

The pigment coating resin is a resin soluble in the aqueous medium of the ink of the present disclosure. A portion of the pigment coating resin is present for example on the surface of the pigment particles to optimize dispersibility of the pigment particles. Another portion of the pigment coating resin is present for example in a dissolved state in the aqueous medium of the ink of the present disclosure.

The pigment coating resin is preferably a styrene-(meth)acrylic resin. The styrene-(meth)acrylic resin includes a styrene unit and a repeating unit derived from at least one monomer of (meth)acrylic acid alkyl ester and (meth)acrylic acid. Examples of the (meth)acrylic acid alkyl ester include methyl (meth)acrylate, ethyl (meth)acrylate, propyl (meth)acrylate, and butyl (meth)acrylate. The styrene-(meth)acrylic resin is preferably a copolymer of styrene, methyl methacrylate, methacrylic acid, and butyl acrylate.

The pigment coating resin has a percentage content in the ink of the present disclosure of preferably at least 0.1% by mass and no greater than 4.0% by mass, and more preferably at least 0.5% by mass and no greater than 1.5% by mass. As a result of the percentage content of the pigment coating resin being set to at least 0.1% by mass and no greater than 4.0% by mass, ejection stability of the ink of the present disclosure can be ensured.

In the ink of the present disclosure, the pigment coating resin has a content ratio of preferably at least 10 parts by mass and no greater than 60 parts by mass to 100 parts by mass of the pigment, and more preferably at least 20 parts by mass and no greater than 30 parts by mass. As a result of the content ratio of the pigment coating resin being set to at least 10 parts by mass and no greater than 60 parts by mass, ejection stability of the ink of the present disclosure can be further optimized.

[Urethane Resin Particles]

The urethane resin particles contain a urethane resin. The urethane resin has a percentage content in the urethane resin particles of preferably at least 80% by mass, more preferably at least 90% by mass, and further preferably 100% by mass.

The urethane resin particles have a volume median diameter of preferably at least 50 nm and no greater than 200 nm, and more preferably at least 70 nm and no greater than 150 nm. As a result of the volume median diameter of the urethane resin particles being set to at least 50 nm, preservation stability of the ink of the present disclosure can be optimized. As a result of the volume median diameter of the urethane resin particles being set to no greater than 200 nm, ejection stability of the ink of the present disclosure can be further optimized.

The urethane resin particles have a percentage content in the ink of the present disclosure of at least 2.5% by mass and no greater than 9.0% by mass, and preferably at least 2.5% by mass and no greater than 4.0% by mass. As a result of the percentage content of the urethane resin particles being set to at least 2.5% by mass, the ink of the present disclosure can form images with excellent adhesion to various non-permeable recording mediums (particularly, a PET film). As a result of the percentage content of the urethane resin particles being set to no greater than 9.0% by mass, the ink of the present disclosure can exhibit excellent ejection stability.

(Urethane Resin)

The urethane resin is a copolymer of a monomer containing a polyisocyanate and a diol compound or a bisphenol compound.

Examples of the polyisocyanate include diisocyanates. Examples of the diisocyanates include aliphatic diisocyanates, alicyclic diisocyanates, and aromatic diisocyanates.

Examples of the aliphatic diisocyanates include ethylene diisocyanate, 2,2,4-trimethylhexamethylene diisocyanate, and 1,6-hexamethylene diisocyanate.

Examples of the alicyclic diisocyanates include hydrogenated 4,4'-diphenylmethane diisocyanate, 1,4-cyclohexane diisocyanate, methylcyclohexylene diisocyanate, isophorone diisocyanate, and norbornane diisocyanate.

Examples of the aromatic diisocyanates include 4,4'-diphenylmethane diisocyanate, xylylene diisocyanate, toluene diisocyanate, and naphthalene diisocyanate.

Examples of the diol compound include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compound include bisphenol A, hydrogenated bisphenol A, bisphenol A-ethylene oxide adducts (e.g., polyoxyethylene(2,2)-2,2-bis(4-hydorxyphenyl)propane), and bisphenol A propylene oxide adducts.

[Polyolefin Resin Particles]

The polyolefin resin particles contain a polyolefin resin. The polyolefin resin has a percentage content in the polyolefin resin particles of preferably at least 80% by mass, more preferably at least 90% by mass, and further preferably 100% by mass.

The polyolefin resin particles have a volume median diameter of preferably at least 50 nm and no greater than 200 nm, and more preferably at least 70 nm and no greater than 150 nm. As a result of the volume median diameter of the polyolefin resin particles being set to at least 50 nm, preservation stability of the ink of the present disclosure can be optimized. As a result of the volume median diameter of the polyolefin resin particles being set to no greater than 200 nm, ejection stability of the ink of the present disclosure can be further optimized.

The polyolefin resin particles have a percentage content in the ink of the present disclosure of at least 2.5% by mass and no greater than 9.0% by mass, and preferably at least 2.5% by mass and no greater than 4.0% by mass. As a result of the percentage content of the polyolefin resin particles being set to at least 2.5% by mass, the ink of the present disclosure can form images with excellent adhesion to various non-permeable recording mediums (particularly, an OPP film). As a result of the percentage content of the polyolefin resin particles being set to no greater than 9.0% by mass, the ink of the present disclosure can exhibit excellent ejection stability.

The total percentage content of the urethane resin particles and the polyolefin resin particles in the ink of the present disclosure is preferably at least 5.0% by mass and no greater than 12.0% by mass, and more preferably at least 5.5% by mass and no greater than 8.0% by mass. As a result of the total percentage content of the urethane resin particles and the polyolefin resin particles being set to at least 5.0% by mass, the ink of the present disclosure can form images with further excellent adhesion to various non-permeable recording mediums. As a result of the total percentage content of the urethane resin particles and the polyolefin resin particles being set to no greater than 12.0% by mass, ejection stability of the ink of the present disclosure can be further optimized.

(Polyolefin Resin)

The polyolefin resin is a resin of which raw material is olefin. Examples of the olefin include ethylene, propylene, and butene. The polyolefin resin may be a copolymer of olefin and any other monomers. The other monomers are not limited particularly so long as it is copolymerizable with olefins and may be styrene, (meth)acrylic acid, or (meth) acrylic acid alkyl ester, for example. Specific examples of the polyolefin resin include polyethylene and polypropylene.

[Dipropylene Glycol Monomethyl Ether]

The dipropylene glycol monomethyl ether has a percentage content in the ink of the present disclosure of at least 4.0% by mass and no greater than 25.0% by mass, preferably at least 6.0% by mass and no greater than 15.0% by mass, and more preferably at least 6.0% by mass and no greater than 10.0% by mass. As a result of the percentage content of the dipropylene glycol monomethyl ether being set to at least 6.0% by mass, the ink of the present disclosure can exhibit an excellent quick-drying property. As a result of the percentage content of the dipropylene glycol monomethyl ether being set to no greater than 25.0% by mass, the ink of the present disclosure can exhibit excellent ejection stability.

[Propylene Glycol]

The propylene glycol has a percentage content in the ink of the present disclosure of at least 9.0% by mass and no greater than 35.0% by mass, preferably at least 15.0% by mass and no greater than 27.0% by mass, and more preferably at least 20.0% by mass and no greater than 27.0% by mass. As a result of the percentage content of the propylene glycol being set to at least 9.0% by mass, the ink of the present disclosure can inhibit occurrence of nozzle clogging.

As a result of the percentage content of the propylene glycol being set to no greater than 35.0% by mass, the ink of the present disclosure can exhibit an excellent quick-drying property.

The total percentage content of the dipropylene glycol monomethyl ether and the propylene glycol in the ink of the present disclosure is preferably at least 12.0% by mass and no greater than 55.0% by mass, and more preferably at least 25.0% by mass and no greater than 40.0% by mass. As a result of the total percentage content of the dipropylene glycol monomethyl ether and propylene glycol being set to at least 12.0% by mass and no greater than 55.0% by mass, the ink of the present disclosure can exhibit an excellent quick-drying property and excellent ejection stability.

[Additional Water-Soluble Organic Solvent]

A water-soluble organic solvent (also referred to below as additional water-soluble organic solvent) other than the dipropylene glycol monomethyl ether and the propylene glycol tends to impair a quick-drying property and ejection stability of the ink of the present disclosure. Therefore, the ink of the present disclosure preferably does not contain the additional water-soluble organic solvent. The additional water-soluble organic solvent has a percentage content in the ink of the present disclosure of preferably no greater than 5.0% by mass, more preferably no greater than 1.0% by mass, and further preferably 0.0% by mass.

[Water]

The water has a percentage content in the ink of the present disclosure of preferably at least 30.0% by mass and no greater than 75.0% by mass, and more preferably at least 40.0% by mass and no greater than 60.0% by mass.

[Surfactant]

Preferably, the ink of the present disclosure further contains a surfactant. The surfactant optimizes compatibility and dispersion stability of each component contained in the ink of the present disclosure. Furthermore, the surfactant optimizes wettability of the ink of the present disclosure to a recording medium. The surfactant in the ink of the present disclosure is preferably a nonionic surfactant.

Examples of the nonionic surfactant in the ink of the present disclosure include acetylene glycol surfactants (surfactants containing an acetylene glycol compound), silicone surfactants (surfactants containing a silicone compound), and fluorine surfactants (surfactants containing a fluoric resin or a fluorine-containing compound). Examples of the acetylene glycol surfactants include an ethylene oxide adduct of acetylene glycol and a propylene oxide adduct of acetylene glycol. The ink of the present disclosure preferably contains a silicon surfactant as the surfactant.

The surfactant has a percentage content in the ink of the present disclosure of preferably at least 0.05 by mass and no greater than 2.0% by mass, and more preferably at least 0.1% by mass and no greater than 0.5% by mass.

[Additional Components]

The ink of the present disclosure may further contain any known additive (e.g., any of a solution stabilizer, an antidrying agent, an antioxidant, a viscosity modifier, a pH adjuster, and an antifungal agent) as necessary.

[Ink Production Method]

The ink of the present disclosure can be produced for example by uniformly mixing a pigment dispersion containing the pigment, a urethane resin emulsion containing the urethane resin particles, a polyolefin resin emulsion containing the polyolefin resin particles, dipropylene glycol monomethyl ether, propylene glycol, and additional components (e.g., water and the surfactant) added as necessary using a stirrer. In production of the ink of the present disclosure, uniform mixing of each component may be followed by removal of foreign matter and coarse particles using a filter (e.g., a filter with a pore diameter of no greater than 5 m).

(Pigment Dispersion)

The pigment dispersion is a dispersion containing the pigment. Preferably, the pigment dispersion further contains the pigment coating resin. The dispersion medium of the pigment dispersion is preferably water.

The pigment has a percentage content in the pigment dispersion of preferably at least 5.0% by mass and no greater than 25.0% by mass, and more preferably at least 10.0% by mass and no greater than 20.0% by mass. The pigment coating resin has a percentage content in the pigment dispersion of preferably at least 1.0% by mass and no greater than 10.0% by mass, and more preferably at least 2.0% by mass and no greater than 6.0% by mass.

The pigment dispersion can be prepared by wet dispersion of the pigment, the pigment coating resin, a dispersion medium (e.g., water), and a component (e.g., the surfactant) added as necessary using a media type wet disperser. Wet dispersion using a media type wet disperser can use small-diameter beads (e.g., beads with a $D_{50}$ of at least 0.5 mm and no greater than 1.0 mm) as a medium, for example. The material of the beads is not particularly limited and is preferably a hard material (e.g., glass or zirconia).

In a case in which the pigment dispersion is added in production of the ink of the present disclosure, the percentage content of the pigment dispersion to all raw materials of the ink is at least 10.0% by mass and no greater than 40.0% by mass, for example.

EXAMPLES

The following describes examples of the present disclosure. However, the present disclosure is not limited to the following examples.

[Pigment Dispersion Preparation]

Pigment dispersions (C) and (BK) for ink preparation use were prepared. The components contained in each pigment dispersion and their amounts are shown below in Table 1.

TABLE 1

| | | Pigment dispersion (C) | Pigment dispersion (BK) |
|---|---|---|---|
| Percentage content [% by mass] | Water | 80 | 80 |
| | Resin A-Na | 5 | 5 |
| | Cyan pigment | 15 | — |
| | Black pigment | — | 15 |
| | Total | 100 | 100 |

In Table 1, "Resin A-Na" represents a resin A (pigment coating resin) neutralized with sodium hydroxide (NaOH). "Cyan pigment" and "Black pigment" are as follows.

Cyan pigment: "HELIOGEN (registered Japanese trademark) BLUE D7088" produced by BASF Corporation Black pigment: "MONARCH (registered Japanese trademark) 800" produced by Cabot Corporation

[Preparation of Resin A]

The resin A was prepared according to the following method for obtaining the "resin A-Na" in Table 1. In detail, a stirrer, a nitrogen inlet tube, a condenser, and a dropping funnel were set at a four-necked flask. Next, 100 parts by mass of isopropyl alcohol and 300 parts by mass of methyl ethyl ketone were added into the flask. Heat reflux at 70° C. was performed on the flask contents under nitrogen bubbling.

Next, a solution L1 was prepared. In detail, the solution L1 being a monomer solution was obtained by mixing 40.0 parts by mass of styrene, 10.0 parts by mass of methacrylic acid, 40.0 parts by mass of methyl methacrylate, 10.0 parts by mass of butyl acrylate, and 0.4 parts by mass of azobisisobutyronitrile (AIBN, polymerization initiator). The solution L1 was dripped into the flask over 2 hours in a state in which heat reflux at 70° C. was performed on the flask contents. After the dripping, heat reflux at 70° C. was performed on the flask contents for additional 6 hours.

Next a solution L2 was prepared. In detail, the solution L2 was obtained by mixing 0.2 parts by mass of AIBN and 150.0 parts by mass of methyl ethyl ketone. The solution L2 was dripped into the flask over 15 minutes. After the dripping, heat reflux at 70° C. was performed on the flask contents for additional 5 hours. In the manner described above, the resin A (styrene-(meth)acrylic resin) was obtained. The resultant resin A had a mass average molecular weight (Mw) of 20,000 and an acid value of 100 mgKOH/g.

Here, the mass average molecular weight Mw of the resin A was measured under the following conditions using a gel filtration chromatography ("HLC-8020GPC", product of Tosoh Corporation).

Columns: "TSKgel Super Multipore HZ-H" produced by Tosoh Corporation (semi-micro columns with 4.6 mm I.D.×15 cm).

Number of columns: 3

Eluent: tetrahydrofuran

Flow rate: 0.35 mL/min.

Sample injection amount: 10 μL

Measurement temperature: 40° C.

Detector: IR detector

A calibration curve of was plotted using n-propylbenzene and seven selected TSKgel Standard Polystyrenes (specifically, F-40, F-20, F-4, F-1, A-5000, A-2500, and A-1000) each produced by Tosoh Corporation.

Furthermore, the acid value of the resin A was measured by a method in accordance with the Japanese Industrial Standards (JIS) K0070-1992 (Test methods for acid value, saponification value, ester value, iodine value, hydroxyl value and unsaponifiable matter of chemical products).

[Pigment Dispersion Preparation]

(Pigment Dispersion (C))

An aqueous solution of sodium hydroxide in an amount necessary to neutralize the resin A was added to the resin A while the resin A was heated in a warm bath at 70° C. More specifically, an aqueous solution of sodium hydroxide with a mass of 1.1 times the neutralization equivalent was added to the resin A. In the manner described above, an aqueous solution of the resin A (resin A-Na) neutralized with sodium hydroxide was obtained. The aqueous solution of the resin A-Na had a pH of 8.

The vessel of a media type wet disperser ("DYNO (registered Japanese trademark) MILL", product of Willy A. Bachofen AG (WAB)) was charged with 5 parts by mass of an aqueous solution containing the resin A-Na, 15 parts by mass of a cyan pigment, and water in the mixing ratio shown in Table 1, so that the total amount was adjusted to 100 parts by mass. Note that the water was added so that the mass of water including the mass of water contained in the aqueous solution of sodium hydroxide used for neutralizing the resin A and the mass of water produced by the neutralization reaction was 80 parts by mass.

Next, a medium (zirconia beads with a diameter of 1.0 mm) was charged into the vessel so that the filling rate of the medium was 70% by volume to the capacity of the vessel. The vessel contents were dispersed using the media type wet disperser. In the manner described above, the pigment dispersion (C) being a pigment dispersion for cyan ink use was obtained.

The pigment dispersion (C) was diluted 300 times with water to obtain a dilution. The dilution was measured using a dynamic light scattering type particle size distribution analyzer ("ZETASIZER (registered Japanese trademark) NANO ZS", product of Malvern Instruments Ltd.) to obtain the volume median diameter ($D_{50}$) of the pigment particles contained in the pigment dispersion (C). Thereafter, it was confirmed that pigment particles with a volume median diameter in the range of 70 nm to 130 nm were dispersed in the pigment dispersion (C).

(Pigment Dispersion (BK))

The pigment dispersion (BK) was prepared according to the same method as that for preparing the pigment dispersion (C) in all aspects other than that the types and amounts of the components used were as shown in Table 1. The pigment dispersion (BK) was a pigment dispersion for black ink use.

[Resin Emulsion]

Resin emulsions (R-1) to (R-5) shown below in Table 2 were prepared as resin emulsions for ink preparation use. The resin emulsions (R-1) to (R-5) contained resin particles (r-1) to (r-5), respectively. In Table 2 below, (R) represents registered Japanese trademark.

<Ink Preparation>

Inks of Examples 1 to 9 and Comparative Examples 1 to 9 were prepared according to the following methods.

Example 1

A beaker was charged with water, 15.0 parts by mass of the pigment dispersion (C) (containing 2.25 parts by mass of the cyan pigment and 0.75 parts by mass of the resin A-Na), 10.1 parts by mass of the resin emulsion (R-1) (containing 3.0 parts by mass of the resin particles (r-1)), 10.0 parts by mass of the resin emulsion (R-3) (containing 3.0 parts by mass of the resin particles (r-3), 25.0 parts by mass of propylene glycol, 8.0 parts by mass of dipropylene glycol monomethyl ether, and 0.2 parts by mass of a silicone surfactant ("SILFACE (registered Japanese trademark) SAG 503A", product of Nissin Chemical Industry Co., Ltd., polyether modified siloxane compound). The amount of the water added was such that the total amount of the mixture in the beaker was 100 parts by mass. The beaker content was mixed at a rotational speed of 400 rpm using a stirrer ("THREE-ONE MOTOR BL-600", product of Shinto Scientific Co., Ltd.) to obtain a mixed liquid. The mixed liquid was filtered using a filter (pore size 5 m) to remove foreign matter and coarse particles contained in the mixed liquid. Through the above, the ink of Example 1 was obtained.

Examples 2 to 9 and Comparative Examples 1 to 9

Inks of Examples 2 to 9 and Comparative Examples 1 to 9 were prepared according to the same method as that for preparing the ink of Example 1 in all aspects other than that the types and amounts of the components were as shown below in Tables 3 and 4.

Note that the numerical vales below in Tables 3 and 4 each indicate a percentage content [% by mass]. "DPGMME" represents dipropylene glycol monomethyl ether.

TABLE 2

| | Manufacturer | Item No. | Resin particles Type | Resin type | $D_{50}$ [nm] | Solid content [% by mass] |
|---|---|---|---|---|---|---|
| R-1 | UBE Corporation | ETERNACOLL (R) UW-1527DF | r-1 | Urethane | 57.8 | 29.8 |
| R-2 | DKS Co. Ltd. | SUPERFLEX (R) 210 | r-2 | Urethane | 70.6 | 35.3 |
| R-3 | Mitsubishi Chemical Corporation | APTOLOK (R) BW-5635 | r-3 | Polyolefin | 132.0 | 30.0 |
| R-4 | UNITIKA LTD. | ARROWBASE (R) SB-1200 | r-4 | Polyolefin | 192.0 | 25.0 |
| R-5 | Nippon Paper Industries Co., Ltd. | AUROREN (R) AE-301 | r-5 | Polyolefin | 64.5 | 30.0 |

TABLE 3

| | Examples | | | | | | | | |
|---|---|---|---|---|---|---|---|---|---|
| | 1 | 2 | 3 | 4 | 5 | 6 | 7 | 8 | 9 |
| Pigment dispersion (C) | 15.0 | 15.0 | 15.0 | 15.0 | 15.0 | 15.0 | 15.0 | 15.0 | — |
| Pigment dispersion (BK) | — | — | — | — | — | — | — | — | 15.0 |
| Pigment particles (r-1) | 3.0 | 3.0 | 3.0 | 3.0 | 8.0 | — | 3.0 | 3.0 | 3.0 |
| Pigment particles (r-2) | — | — | — | — | — | 3.0 | — | — | — |
| Pigment particles (r-3) | 3.0 | 3.0 | 3.0 | 8.0 | 3.0 | 3.0 | — | — | 3.0 |
| Pigment particles (r-4) | — | — | — | — | — | — | 3.0 | — | — |
| Pigment particles (r-5) | — | — | — | — | — | — | — | 3.0 | — |
| Propylene glycol | 25.0 | 10.0 | 30.0 | 25.0 | 25.0 | 25.0 | 25.0 | 25.0 | 25.0 |
| DPGMME | 8.0 | 5.0 | 20.0 | 8.0 | 8.0 | 8.0 | 8.0 | 8.0 | 8.0 |
| Dibutyl triglycol | — | — | — | — | — | — | — | — | — |
| Silicone surfactant | 0.2 | 0.2 | 0.2 | 0.2 | 0.2 | 0.2 | 0.2 | 0.2 | 0.2 |
| Water | Rest | Rest | Rest | Rest | Rest | Rest | Rest | Rest | Rest |
| Total | 100 | 100 | 100 | 100 | 100 | 100 | 100 | 100 | 100 |

TABLE 4

| | Comparative Example | | | | | | | | |
|---|---|---|---|---|---|---|---|---|---|
| | 1 | 2 | 3 | 4 | 5 | 6 | 7 | 8 | 9 |
| Pigment dispersion (C) | 15.0 | 15.0 | 15.0 | 15.0 | 15.0 | 15.0 | 15.0 | 15.0 | 15.0 |
| Pigment dispersion (BK) | — | — | — | — | — | — | — | — | — |
| Pigment particles (r-1) | 3.0 | 3.0 | 2.0 | 10.0 | 3.0 | 3.0 | 3.0 | 3.0 | 3.0 |
| Pigment particles (r-2) | — | — | — | — | — | — | — | — | — |
| Pigment particles (r-3) | 2.0 | 10.0 | 3.0 | 3.0 | 3.0 | 3.0 | 3.0 | 3.0 | 3.0 |
| Pigment particles (r-4) | — | — | — | — | — | — | — | — | — |
| Pigment particles (r-5) | — | — | — | — | — | — | — | — | — |
| Propylene glycol | 25.0 | 25.0 | 25.0 | 25.0 | 25.0 | 25.0 | 25.0 | 8.0 | 40.0 |
| DPGMME | 8.0 | 8.0 | 8.0 | 8.0 | 3.0 | — | 30.0 | 20.0 | 8.0 |
| Dibutyl triglycol | — | — | — | — | — | 8.0 | — | — | — |
| Silicone surfactant | 0.2 | 0.2 | 0.2 | 0.2 | 0.2 | 0.2 | 0.2 | 0.2 | 0.2 |
| Water | Rest | Rest | Rest | Rest | Rest | Rest | Rest | Rest | Rest |
| Total | 100 | 100 | 100 | 100 | 100 | 100 | 100 | 100 | 100 |

<Evaluation>

With respect to each of the inks of Examples 1 to 9 and Comparative Examples 1 to 9, adhesion of formed images to a non-permeable recording medium, a quick-drying property, and ejection stability were evaluated. Evaluation results are shown below in Tables 5 and 6. Note that evaluations were carried out at a temperature of 25° C. and a relative humidity of 60% unless otherwise specifically noted.

[Evaluation Apparatus]

As an evaluation apparatus, a line head inkjet recording apparatus (testing apparatus produced by KYOCERA Document Solutions Japan Inc.) was used. The evaluation apparatus included a conveyor table and four recording heads ("KJ4B-HD06MHG-STDV", product of KYOCERA Corporation) arranged in parallel in a printing direction. The recording heads included a recording head for black ink use, a recording head for cyan ink use, a recording head for magenta ink use, and a recording head for yellow ink use arranged in the stated order from upstream to downstream in the printing direction. Each recording head included 2656 nozzles. The intervals between the recording heads were set to 55 cm. The recording heads were set to have an application voltage of 21 V, a drive frequency of 18 kHz, an ejection droplet amount of 3 pL, a head temperature of 32° C., and a resolution of 600 dpi, and the number of times of pre-ejection flushing was set to 1000 times. An OPP film ("FOR-AQ", product of FUTAMURA CHEMICAL CO., LTD., one side thereof subjected to corona discharge) and a PET film ("FE2001", product of FUTAMURA CHEMICAL CO., LTD., one side thereof subjected to corona discharge) were used each as a non-permeable recording medium. In detail, an image was formed on a side of each of the OPP film and the PET film that has been subjected to corona discharge. The conveyor table was pre-warmed to 40° C. in image formation using the evaluation apparatus. Furthermore, the image conveyance speed was set to 30 m/min. in image formation using the evaluation apparatus.

[Adhesion]

Using the evaluation apparatus, a solid image (printing rate 100%) was formed on each non-permeable recording medium (each of the PET film and the OPP film). The non-permeable recording mediums each with the solid image formed thereon were dried at 80° C. for 60 seconds using a dryer ("ON-300SB" available at AS ONE Corporation, constant temperature dryer). The dried films were taken to be evaluation films. Lattice-like (grid-like) incisions of 11 vertical lines and 11 horizontal lines were made at 10-mm intervals in the solid image on each evaluation film to form 100 square-shaped cells of 10 mm on each side. Adhesive tape ("CELLOTAPE (registered Japanese trademark) CT-18S", product of Nichiban Co., Ltd.) was attached onto the solid image with the incisions formed therein, and peeled off from the solid image at an angle of approximately 60 degrees (peeling). The peeling of the adhesive tape was carried out at a speed at which the time from a peeling start to a peeling end was 1 second. After the peeling, the evaluation films were each observed to count the number of peeled cells. The counted numbers were taken to be evaluation values. Adhesion was evaluated according to the following criteria.

(Evaluation Criteria of Adhesion)

A (good): The number of peeled cells was less than 10 in each of the PET film and the OPP film.

B (poor): The number of peeled cells was 10 or more in at least one of the PET film and the OPP film.

[Quick-Drying Property]

The ink being an evaluation target was loaded in an inkjet type applied liquid drop observation device ("DROPMEASURE (registered Japanese trademark), product of MICROJET Corporation). One droplet of the evaluation target was ejected from a head (piezoelectric head) included in the observation device, and landed on a stage for evaluation use. In doing so, the ejected droplet had a volume of 30 to 80 pL and an ejection speed of 5 to 8 m/sec. Next, change over time in the volume of the droplet that has landed on the stage was observed using a camera included in the observation device. Thereafter, a volume $V_0$ of the droplet directly after the landing and a volume $V_1$ of the droplet after elapse of 1000 milliseconds from the landing were measured. An evaporation rate of the droplet during the 1000 milliseconds was calculated based on an equation "$100 \times V_0 - V_1/V_0$". Quick-drying property were evaluated according to the following criteria.

(Criteria of Quick-Drying Property)

A (good): The evaporation rate of the droplet was 40% or more.

B (poor): The evaporation rate of the droplet was at least 20% and less than 40%.

C (particularly poor): The evaporation rate of the droplet was less than 20%.

[Ejection Stability]

Pre-ejection flushing (1000 times) was performed using the evaluation apparatus. Next, an evaluation image was formed on one sheet of printing paper ("SUPER FINE PAPER", product of Seiko Epson Corporation, A4-size plain paper) using the evaluation apparatus. The evaluation image was an image of striped patterns arranged in four rows in a printing direction and each including 55 vertical lines (220 vertical lines in total). In each striped pattern, the lines had a 1-dot line width and the intervals between the lines was 3-dot width (pattern in which a one-dot-wide fine line and a three-dot-wide space are repeated). The printing paper with the evaluation image formed thereon was dried at 80° C. for 120 seconds using a dryer ("ON-300SB", available at AS ONE Corporation, constant-temperature dryer). The dried printing paper was taken to be a recording medium for evaluation use.

Note that the evaluation image includes four striped patterns as explained above. In each of the striped patterns, 54 spaces (pitches) were present between the lines. As such, 216 inter-line pitches in total were present in the evaluation image.

Using an optical microscope, an enlarged image of the evaluation image formed on the recording medium for evaluation use was captured. Next, the length of each of the 216 inter-line pitches present in the evaluation image was measured using an analysis tool. Thereafter, a dispersion (3σ) of the measured inter-line pitches was calculated. The above evaluation was carried out four times and the average value (Δ3σ) of the 3σ measured in each time was taken to be an evaluation value for ejection stability. Ejection stability was evaluated according to the following criteria.

(Criteria of Ejection Stability)

A (good): The evaluation value (Δ3σ) was less than 40.0.

B (poor): The evaluation value (Δ3σ) was 40.0 or more.

C (particularly poor): The inter-line pitches were not measured because regular striped patterns were not formed due to significant discharge failure.

TABLE 5

|  |  | Example |  |  |  |  |  |  |  |  |
|---|---|---|---|---|---|---|---|---|---|---|
|  |  | 1 | 2 | 3 | 4 | 5 | 6 | 7 | 8 | 9 |
| Adhesion | PET evaluation value | 8 | 8 | 9 | 7 | 0 | 6 | 9 | 8 | 8 |
|  | OPP evaluation value | 9 | 8 | 9 | 2 | 8 | 8 | 8 | 9 | 6 |
|  | Rating | A | A | A | A | A | A | A | A | A |
| Quick-drying property | Evaporation rate [%] | 47.6 | 44.5 | 52.3 | 44.1 | 42.4 | 43.0 | 47.5 | 45.8 | 46.6 |
|  | Rating | A | A | A | A | A | A | A | A | A |
| Ejection stability | Evaluation value | 22.4 | 31.8 | 17.4 | 33.1 | 38.4 | 21.1 | 27.0 | 20.6 | 25.9 |
|  | Rating | A | A | A | A | A | A | A | A | A |

TABLE 6

|  |  | Comparative Example |  |  |  |  |  |  |  |  |
|---|---|---|---|---|---|---|---|---|---|---|
|  |  | 1 | 2 | 3 | 4 | 5 | 6 | 7 | 8 | 9 |
| Adhesion | PET evaluation value | 9 | 7 | 10 | 0 | 7 | 8 | 8 | 7 | 8 |
|  | OPP evaluation value | 12 | 0 | 9 | 8 | 8 | 6 | 8 | 7 | 9 |
|  | Rating | B | A | B | A | A | A | A | A | A |

TABLE 6-continued

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Quick-drying property | Evaporation rate [%] | 46.7 | 42.2 | 41.5 | 47.4 | 15.7 | 26.4 | 55.6 | 56.8 | 34.0 |
|  | Rating | A | A | A | A | C | B | A | A | B |
| Ejection stability | Evaluation value | 21.0 | 41.5 | 24.1 | 43.9 | 48.2 | 29.8 | — | — | 25.8 |
|  | Rating | A | B | A | B | B | A | C | C | A |

As shown in Tables 1 to 6, the inks of Examples 1 to 9 each contained a pigment, urethane resin particles, polyolefin resin particles, dipropylene glycol monomethyl ether, propylene glycol, and water. The urethane resin particles had a percentage content of at least 2.5% by mass and no greater than 9.0% by mass. The polyolefin resin particles had a percentage content of at least 2.5% by mass and no greater than 9.0% by mass. The dipropylene glycol monomethyl ether had a percentage content of at least 4.0% by mass and no greater than 25.0% by mass. The propylene glycol had a percentage content of at least 9.0% by mass and no greater than 35.0% by mass. The inks of Examples 1 to 9 had an excellent quick-drying property and excellent ejection stability. With any of the inks of Examples 1 to 9, images with excellent adhesion to various non-permeable recording mediums were formed.

By contrast, the ink of Comparative Example 1 had a percentage content of the polyolefin resin particles being resin particles having high affinity with OPP films of less than 2.5% by mass. The ink of Comparative Example 1, which was deficient in polyolefin resin particles, did not form images with excellent adhesion to the OPP film.

The ink of Comparative Example 2 had a percentage content of the polyolefin resin particles of greater than 9.0% by mass. The ink of Comparative Example 2, which contained an excessive amount of polyolefin resin particles, was poor in ejection stability.

The ink of Comparative Example 3 had a percentage content of the urethane resin particles being resin particles having high affinity with PET films of less than 2.5% by mass. The ink of Comparative Example 3, which was deficient in urethane resin particles, did not form images with excellent adhesion to the PET film.

The ink of Comparative Example 4 had a percentage content of the urethane resin particles of greater than 9.0% by mass. The ink of Comparative Example 4, which contained an excessive amount of urethane resin particles, was poor in ejection stability.

The ink of Comparative Example 5 had a percentage content of the dipropylene glycol monomethyl ether of less than 4.0% by mass, which is a component enhancing wet spreadability of an ink. The ink of Comparative Example 6 did not contain dipropylene glycol monomethyl ether. The ink of Comparative Examples 5 and 6 were poor in wet spreadability and did not exhibit a quick-drying property. The ink of Comparative Example 5 was also poor in ejection stability.

The ink of Comparative Example 7 had a percentage content of the dipropylene glycol monomethyl ether of greater than 25.0% by mass. The ink of Comparative Example 7, which contained an excessive amount of dipropylene glycol monomethyl ether, was poor in ejection stability.

The ink of Comparative Example 8 had a percentage content of the propylene glycol being a component with a moisturizing property of less than 9.0% by mass. The ink of Comparative Example 8 had particularly poor ejection stability due to its tendency to cause nozzle clogging.

The ink of Comparative Example 9 had a percentage content of the propylene glycol of greater than 35.0% by mass. The ink of Comparative Example 9, which contained an excessive amount of propylene glycol with a poor drying property, did not dry quickly.

What is claimed is:

1. An inkjet ink comprising:
a pigment, urethane resin particles, polyolefin resin particles, a water-soluble organic solvent, and water, wherein
the water-soluble organic solvent includes dipropylene glycol monomethyl ether and propylene glycol,
the urethane resin particles have a percentage content of at least 2.5% by mass and no greater than 9.0% by mass,
the polyolefin resin particles have a percentage content of at least 2.5% by mass and no greater than 9.0% by mass,
the dipropylene glycol monomethyl ether has a percentage content of at least 4.0% by mass and no greater than 25.0% by mass,
the propylene glycol has a percentage content of at least 9.0% by mass and no greater than 35.0% by mass, and
an additional water-soluble organic solvent other than the dipropylene glycol monomethyl ether and the propylene glycol has a percentage content of no greater than 1.0% by mass.

2. The inkjet ink according to claim 1, wherein
the polyolefin resin particles have a volume median diameter of at least 50 nm and no greater than 200 nm, and
the urethane resin particles have a volume median diameter of at least 50 nm and no greater than 200 nm.

3. The inkjet ink according to claim 1, further comprising a surfactant, wherein
the surfactant includes a silicone surfactant.

4. The inkjet ink according to claim 1, wherein
a total percentage content of the urethane resin particles and the polyolefin resin particles is at least 5.0% by mass and no greater than 12.0% by mass.

5. An inkjet ink comprising:
a pigment, urethane resin particles including a urethane resin, polyolefin resin particles, dipropylene glycol monomethyl ether, propylene glycol, and water, wherein
the urethane resin is a copolymer of a polyisocyanate and a diol compound or a bisphenol compound, the diol compound is at least one of ethylene glycol, diethylene glycol, triethylene glycol, 1,2-propanediol, 1,3-propanediol, 1,4-butanediol, neopentyl glycol, 2-butene-1, 4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol, the urethane resin particles have a percentage content of at least 2.5% by mass and no greater than 9.0% by mass, the polyolefin resin particles have a percentage content of at least 2.5% by mass and no greater than 9.0% by mass, the dipropylene glycol monomethyl ether has a percentage content of at least 4.0% by mass and no greater than 25.0% by mass, and the propylene glycol has a percentage content of at least 9.0% by mass and no greater than 35.0% by mass.

* * * * *